US00RE45854E

(19) United States
(12) Reissued Patent
Gittinger et al.

(10) Patent Number: US RE45,854 E
(45) Date of Reissued Patent: Jan. 19, 2016

(54) METHOD AND AN APPARATUS FOR CAPTURING THREE-DIMENSIONAL DATA OF AN AREA OF SPACE

(71) Applicant: FARO Technologies, Inc., Lake Mary, FL (US)

(72) Inventors: Juergen Gittinger, Ludwigsburg (DE); Bernd-Dietmar Becker, Ludwigsburg (DE); Reinhard Becker, Ludwigsburg (DE)

(73) Assignee: FARO TECHNOLOGIES, INC., Lake Mary, FL (US)

(21) Appl. No.: 14/549,851

(22) Filed: Nov. 21, 2014

Related U.S. Patent Documents

Reissue of:

(64) Patent No.: 7,847,922
Issued: Dec. 7, 2010
Appl. No.: 12/515,489
PCT Filed: Jun. 29, 2007
PCT No.: PCT/EP2007/005789
§ 371 (c)(1),
(2) Date: May 19, 2009
PCT Pub. No.: WO2008/003436
PCT Pub. Date: Jan. 10, 2008

(30) Foreign Application Priority Data

Jul. 3, 2006 (DE) ..... 10 2006 031 580

(51) Int. Cl.
*G01C 3/08* (2006.01)
*G01C 1/00* (2006.01)
(Continued)

(52) U.S. Cl.
CPC ..... *G01C 15/06* (2013.01); *G01C 15/02* (2013.01)

(58) Field of Classification Search
CPC ..... G01C 15/02; G01C 15/04; G01C 15/06
USPC ..... 382/103, 105, 154; 356/4.01, 614; 358/453, 475, 480
See application file for complete search history.

(56) References Cited

U.S. PATENT DOCUMENTS 5,898,484 A 4/1999 Harris
D423,534 S 4/2000 Raab et al.
(Continued)

FOREIGN PATENT DOCUMENTS

AU 2005200937 A1 9/2006
CN 2236119 y 9/1996
(Continued)

OTHER PUBLICATIONS

Bijhold, Jurrien, et al., "Forensic Imaging—A Review: 2001 to 2004", 14th International Forensic Science Symposium, Review Papers, Interpol—Lyon, Oct. 19-22, 2004, pp. 189-205.
(Continued)

*Primary Examiner* — Kenneth J Whittington
(74) *Attorney, Agent, or Firm* — Cantor Colburn LLP

(57) ABSTRACT

In a method for capturing three-dimensional data of an area of space, a plurality of measuring beams (Ls) are sent out to a plurality of measuring points. A detector (50) receives a plurality of reflected beams (Lr) which are reflected by the measuring points (34a). A plurality of distances to the measuring points (34a, 34b) are determined as a function of the reflected beams (Lr). According to one aspect of the invention, at least one object (30) which comprises a hidden channel (66) having a visible entry opening (72) is located in the area of space. A rod-shaped element (32) is inserted into the channel (66) in such a manner that a [free end] *proximal portion* (70) protrudes from the entry opening (72). A first distance to a first measuring point (34a) and a second distance to a second measuring point (34b) are determined. An orientation (74) of the hidden channel (66) is determined as a function of the first and the second distances.

14 Claims, 4 Drawing Sheets

(51) Int. Cl.
*G01C 15/06* (2006.01)
*G01C 15/02* (2006.01)

(56) References Cited

U.S. PATENT DOCUMENTS

D441,632 S 5/2001 Raab et al.
D472,824 S 4/2003 Raab et al.
D479,544 S 9/2003 Raab et al.
6,675,122 B1 * 1/2004 Markendorf et al. ..... 702/150
D490,831 S 6/2004 Raab et al.
D491,210 S 6/2004 Raab et al.
7,230,689 B2 6/2007 Lau
7,242,590 B1 7/2007 Yeap et al.
7,246,030 B2 7/2007 Raab et al.
7,249,421 B2 7/2007 MacManus et al.
7,256,899 B1 8/2007 Faul et al.
7,269,910 B2 9/2007 Raab et al.
D551,943 S 10/2007 Hodjat et al.
7,285,793 B2 * 10/2007 Husted ..... 250/577
7,296,364 B2 11/2007 Seitz et al.
7,296,955 B2 11/2007 Dreier
7,296,979 B2 11/2007 Raab et al.
7,306,339 B2 12/2007 Kaufman et al.
7,307,701 B2 12/2007 Hoffman, II
7,312,862 B2 12/2007 Zumbrunn et al.
7,313,264 B2 12/2007 Crampton
D559,657 S 1/2008 Wohlford et al.
7,319,512 B2 1/2008 Ohtomo et al.
7,330,242 B2 2/2008 Reichert et al.
7,337,344 B2 2/2008 Barman et al.
7,342,650 B2 3/2008 Kern et al.
7,348,822 B2 3/2008 Baer
7,352,446 B2 4/2008 Bridges et al.
7,360,648 B1 4/2008 Blaschke
7,372,558 B2 5/2008 Kaufman et al.
7,372,581 B2 5/2008 Raab et al.
7,383,638 B2 6/2008 Granger
7,388,654 B2 6/2008 Raab et al.
7,389,870 B2 6/2008 Slappay
7,395,606 B2 7/2008 Crampton
7,400,384 B1 7/2008 Evans et al.
7,403,268 B2 7/2008 England et al.
7,403,269 B2 7/2008 Yamashita et al.
7,430,068 B2 9/2008 Becker et al.
7,430,070 B2 9/2008 Soreide et al.
7,441,341 B2 10/2008 Eaton
7,443,555 B2 10/2008 Blug et al.
7,447,931 B1 11/2008 Rischar et al.
7,449,876 B2 11/2008 Pleasant et al.
7,454,265 B2 11/2008 Marsh
7,463,368 B2 12/2008 Morden et al.
7,477,359 B2 1/2009 England et al.
7,477,360 B2 1/2009 England et al.
7,480,037 B2 1/2009 Palmateer et al.
7,508,496 B2 3/2009 Mettenleiter et al.
7,508,971 B2 3/2009 Vaccaro et al.
7,515,256 B2 4/2009 Ohtomo et al.
7,525,276 B2 4/2009 Eaton
7,527,205 B2 5/2009 Zhu et al.
7,528,768 B2 5/2009 Wakayama et al.
7,541,830 B2 6/2009 Fahrbach et al.
7,545,517 B2 6/2009 Rueb et al.
7,546,689 B2 6/2009 Ferrari et al.
7,551,771 B2 6/2009 England, III
7,552,644 B2 6/2009 Haase et al.
7,557,824 B2 7/2009 Holliman
7,561,598 B2 7/2009 Stratton et al.
7,564,250 B2 7/2009 Hocker
7,568,293 B2 8/2009 Ferrari
7,578,069 B2 8/2009 Eaton
D599,226 S 9/2009 Gerent et al.
7,589,595 B2 9/2009 Cutler
7,589,825 B2 9/2009 Orchard et al.
7,591,077 B2 9/2009 Pettersson
7,591,078 B2 9/2009 Crampton
7,599,106 B2 10/2009 Matsumoto et al.
7,600,061 B2 10/2009 Honda
7,602,873 B2 10/2009 Eidson
7,604,207 B2 10/2009 Hasloecher et al.
7,610,175 B2 10/2009 Eidson
7,614,157 B2 11/2009 Granger
7,624,510 B2 12/2009 Ferrari
7,625,335 B2 12/2009 Deichmann et al.
7,626,690 B2 12/2009 Kumagai et al.
D607,350 S 1/2010 Cooduvalli et al.
7,656,751 B2 2/2010 Rischar et al.
7,659,995 B2 2/2010 Knighton et al.
D610,926 S 3/2010 Gerent et al.
7,693,325 B2 4/2010 Pulla et al.
7,697,748 B2 4/2010 Dimsdale et al.
7,701,592 B2 4/2010 Saint Clair et al.
7,712,224 B2 5/2010 Hicks
7,721,396 B2 5/2010 Fleischman
7,728,833 B2 6/2010 Verma et al.
7,728,963 B2 6/2010 Kirschner
7,733,544 B2 6/2010 Becker et al.
7,735,234 B2 6/2010 Briggs et al.
7,743,524 B2 6/2010 Eaton et al.
7,752,003 B2 7/2010 MacManus
7,756,615 B2 7/2010 Barfoot et al.
7,765,707 B2 8/2010 Tomelleri
7,769,559 B2 8/2010 Reichert
7,774,949 B2 8/2010 Ferrari
7,777,761 B2 8/2010 England et al.
7,779,548 B2 8/2010 Ferrari
7,779,553 B2 8/2010 Jordil et al.
7,784,194 B2 8/2010 Raab et al.
7,787,670 B2 8/2010 Urushiya
7,793,425 B2 9/2010 Bailey
7,798,453 B2 9/2010 Maningo et al.
7,800,758 B1 9/2010 Bridges et al.
7,804,602 B2 9/2010 Raab
7,805,851 B2 10/2010 Pettersson
7,805,854 B2 10/2010 Eaton
7,809,518 B2 10/2010 Zhu et al.
7,834,985 B2 11/2010 Morcom
7,847,922 B2 12/2010 Gittinger et al.
RE42,055 E 1/2011 Raab et al.
7,869,005 B2 1/2011 Ossig et al.
RE42,082 E 2/2011 Raab et al.
7,881,896 B2 2/2011 Atwell et al.
7,889,324 B2 2/2011 Yamamoto
7,891,248 B2 2/2011 Hough et al.
7,900,714 B2 3/2011 Milbourne et al.
7,903,245 B2 3/2011 Miousset et al.
7,903,261 B2 3/2011 Saint Clair et al.
7,908,757 B2 3/2011 Ferrari
7,933,055 B2 4/2011 Jensen et al.
7,935,928 B2 5/2011 Serger et al.
7,965,747 B2 6/2011 Kumano
7,982,866 B2 7/2011 Vogel
D643,319 S 8/2011 Ferrari et al.
7,990,397 B2 8/2011 Bukowski et al.
7,994,465 B1 8/2011 Bamji et al.
7,995,834 B1 8/2011 Knighton et al.
8,001,697 B2 8/2011 Danielson et al.
8,020,657 B2 9/2011 Allard et al.
8,022,812 B2 9/2011 Beniyama et al.
8,028,432 B2 10/2011 Bailey et al.
8,036,775 B2 10/2011 Matsumoto et al.
8,045,762 B2 10/2011 Otani et al.
8,051,710 B2 11/2011 Van Dam et al.
8,052,857 B2 11/2011 Townsend
8,064,046 B2 11/2011 Ossig et al.
8,065,861 B2 11/2011 Caputo
8,082,673 B2 12/2011 Desforges et al.
8,099,877 B2 1/2012 Champ
8,117,668 B2 2/2012 Crampton et al.
8,123,350 B2 2/2012 Cannell et al.
8,152,071 B2 4/2012 Doherty et al.
D659,035 S 5/2012 Ferrari et al.
8,171,650 B2 5/2012 York et al.
8,179,936 B2 5/2012 Bueche et al.
D662,427 S 6/2012 Bailey et al.

(56) References Cited

U.S. PATENT DOCUMENTS

| | | | | |
|---|---|---|---|---|
| 8,218,131 | B2 | 7/2012 | Otani et al. | |
| 8,224,032 | B2 | 7/2012 | Fuchs et al. | |
| 8,260,483 | B2 | 9/2012 | Barfoot et al. | |
| 8,269,984 | B2 | 9/2012 | Hinderling et al. | |
| 8,276,286 | B2 | 10/2012 | Bailey et al. | |
| 8,284,407 | B2 | 10/2012 | Briggs et al. | |
| 8,310,653 | B2 | 11/2012 | Ogawa et al. | |
| 8,321,612 | B2 | 11/2012 | Hartwich et al. | |
| 8,346,392 | B2 | 1/2013 | Walser et al. | |
| 8,346,480 | B2 | 1/2013 | Trepagnier et al. | |
| 8,352,212 | B2 | 1/2013 | Fetter et al. | |
| 8,353,059 | B2 | 1/2013 | Crampton et al. | |
| D676,341 | S | 2/2013 | Bailey et al. | |
| 8,379,191 | B2 | 2/2013 | Braunecker et al. | |
| 8,381,704 | B2 | 2/2013 | Debelak et al. | |
| 8,384,914 | B2 | 2/2013 | Becker et al. | |
| D678,085 | S | 3/2013 | Bailey et al. | |
| 8,391,565 | B2 | 3/2013 | Purcell et al. | |
| 8,402,669 | B2 | 3/2013 | Ferrari et al. | |
| 8,422,035 | B2 | 4/2013 | Hinderling et al. | |
| 8,497,901 | B2 | 7/2013 | Pettersson | |
| 8,533,967 | B2 | 9/2013 | Bailey et al. | |
| 8,537,374 | B2 | 9/2013 | Briggs et al. | |
| 8,619,265 | B2 | 12/2013 | Steffey et al. | |
| 8,645,022 | B2 | 2/2014 | Yoshimura et al. | |
| 8,659,748 | B2 | 2/2014 | Dakin et al. | |
| 8,659,752 | B2 | 2/2014 | Cramer et al. | |
| 8,661,700 | B2 | 3/2014 | Briggs et al. | |
| 8,677,643 | B2 | 3/2014 | Bridges et al. | |
| 8,683,709 | B2 | 4/2014 | York | |
| 8,699,007 | B2 | 4/2014 | Becker et al. | |
| 8,705,012 | B2 | 4/2014 | Greiner et al. | |
| 8,705,016 | B2 | 4/2014 | Schumann et al. | |
| 8,718,837 | B2 | 5/2014 | Wang et al. | |
| 8,784,425 | B2 | 7/2014 | Ritchey et al. | |
| 8,797,552 | B2 | 8/2014 | Suzuki et al. | |
| 8,830,485 | B2 | 9/2014 | Chow et al. | |
| 2004/0119020 | A1 | 6/2004 | Bodkin | |
| 2005/0188557 | A1 | 9/2005 | Raab et al. | |
| 2006/0066836 | A1* | 3/2006 | Bridges et al. | 356/5.13 |
| 2006/0182314 | A1* | 8/2006 | England et al. | 382/106 |
| 2006/0244746 | A1* | 11/2006 | England et al. | 345/419 |
| 2007/0171394 | A1* | 7/2007 | Steiner et al. | 356/5.01 |
| 2008/0218728 | A1* | 9/2008 | Kirschner | 356/4.01 |
| 2009/0322859 | A1 | 12/2009 | Shelton et al. | |
| 2009/0323121 | A1 | 12/2009 | Valkenburg et al. | |
| 2010/0095542 | A1 | 4/2010 | Ferrari | |
| 2010/0321152 | A1 | 12/2010 | Argudyaev et al. | |
| 2011/0001958 | A1 | 1/2011 | Bridges et al. | |
| 2012/0069352 | A1 | 3/2012 | Ossig et al. | |
| 2012/0113913 | A1 | 5/2012 | Tiirola et al. | |
| 2012/0140244 | A1 | 6/2012 | Gittinger et al. | |
| 2012/0217357 | A1 | 8/2012 | Franke | |
| 2012/0260512 | A1 | 10/2012 | Kretschmer et al. | |
| 2012/0260611 | A1 | 10/2012 | Jones et al. | |
| 2012/0262700 | A1 | 10/2012 | Schumann et al. | |
| 2012/0287265 | A1 | 11/2012 | Schumann et al. | |
| 2013/0010307 | A1 | 1/2013 | Greiner et al. | |
| 2013/0025143 | A1 | 1/2013 | Bailey et al. | |
| 2013/0025144 | A1 | 1/2013 | Briggs et al. | |
| 2013/0027515 | A1 | 1/2013 | Vinther et al. | |
| 2013/0062243 | A1 | 3/2013 | Chang et al. | |
| 2013/0070250 | A1 | 3/2013 | Ditte et al. | |
| 2013/0094024 | A1 | 4/2013 | Ruhland et al. | |
| 2013/0097882 | A1 | 4/2013 | Bridges et al. | |
| 2013/0125408 | A1 | 5/2013 | Atwell et al. | |
| 2013/0162472 | A1 | 6/2013 | Najim et al. | |
| 2013/0176453 | A1 | 7/2013 | Mate et al. | |
| 2013/0201487 | A1 | 8/2013 | Ossig et al. | |
| 2013/0205606 | A1 | 8/2013 | Briggs et al. | |
| 2013/0212889 | A9 | 8/2013 | Bridges et al. | |
| 2013/0222816 | A1 | 8/2013 | Briggs et al. | |
| 2013/0300740 | A1 | 11/2013 | Snyder et al. | |
| 2014/0002608 | A1 | 1/2014 | Atwell et al. | |
| 2014/0049784 | A1 | 2/2014 | Woloschyn et al. | |
| 2014/0063489 | A1 | 3/2014 | Steffey et al. | |
| 2014/0226190 | A1 | 8/2014 | Bridges et al. | |
| 2014/0240690 | A1 | 8/2014 | Newman et al. | |
| 2014/0362424 | A1 | 12/2014 | Bridges et al. | |

FOREIGN PATENT DOCUMENTS

| | | | |
|---|---|---|---|
| CN | 1307241 | A | 8/2001 |
| CN | 2508896 | Y | 9/2002 |
| CN | 2665668 | Y | 12/2004 |
| CN | 1630804 | A | 6/2005 |
| CN | 1630805 | A | 6/2005 |
| CN | 1688867 | A | 10/2005 |
| CN | 1735789 | | 2/2006 |
| CN | 1812868 | A | 8/2006 |
| CN | 1818537 | A | 8/2006 |
| CN | 1838102 | A | 9/2006 |
| CN | 1839293 | A | 9/2006 |
| CN | 1853084 | A | 10/2006 |
| CN | 1926400 | A | 3/2007 |
| CN | 101024286 | A | 8/2007 |
| CN | 101156043 | A | 4/2008 |
| CN | 101163939 | A | 4/2008 |
| CN | 101371099 | A | 2/2009 |
| CN | 101416024 | | 4/2009 |
| CN | 101484828 | | 7/2009 |
| CN | 201266071 | Y | 7/2009 |
| CN | 101506684 | | 8/2009 |
| CN | 101511529 | A | 8/2009 |
| DE | 2216765 | A1 | 4/1972 |
| DE | 3227980 | A1 | 5/1983 |
| DE | 3245060 | A1 | 7/1983 |
| DE | 3340317 | A1 | 8/1984 |
| DE | 4027990 | C1 | 2/1992 |
| DE | 4222642 | A1 | 1/1994 |
| DE | 4340756 | A1 | 6/1994 |
| DE | 4303804 | A1 | 8/1994 |
| DE | 4445464 | A1 | 7/1995 |
| DE | 4410775 | A1 | 10/1995 |
| DE | 4412044 | A1 | 10/1995 |
| DE | 29622033 | | 2/1997 |
| DE | 19543763 | A1 | 5/1997 |
| DE | 19601875 | A1 | 7/1997 |
| DE | 19607345 | A1 | 8/1997 |
| DE | 19720049 | A1 | 11/1998 |
| DE | 19811550 | A1 | 9/1999 |
| DE | 19820307 | A1 | 11/1999 |
| DE | 19850118 | A1 | 5/2000 |
| DE | 19928958 | A1 | 11/2000 |
| DE | 10114126 | A1 | 10/2001 |
| DE | 10026357 | A1 | 1/2002 |
| DE | 20208077 | U1 | 5/2002 |
| DE | 10137241 | A1 | 9/2002 |
| DE | 10155488 | A1 | 5/2003 |
| DE | 10219054 | A1 | 11/2003 |
| DE | 10232028 | | 2/2004 |
| DE | 10336458 | A1 | 2/2004 |
| DE | 10244643 | A1 | 4/2004 |
| DE | 20320216 | U1 | 4/2004 |
| DE | 10304188 | A1 | 8/2004 |
| DE | 10326848 | A1 | 1/2005 |
| DE | 202005000983 | U1 | 3/2005 |
| DE | 10361870 | A | 7/2005 |
| DE | 102004015668 | B3 | 9/2005 |
| DE | 102004015111 | A1 | 10/2005 |
| DE | 102004028090 | A1 | 12/2005 |
| DE | 103 61 870 | B4 | 5/2006 |
| DE | 202006005643 | U1 | 8/2006 |
| DE | 102004010083 | B4 | 11/2006 |
| DE | 102005043931 | A1 | 3/2007 |
| DE | 102005056265 | A1 | 5/2007 |
| DE | 102006053611 | A1 | 5/2007 |
| DE | 102005060967 | A1 | 6/2007 |
| DE | 102006023902 | | 11/2007 |
| DE | 102006024534 | A1 | 11/2007 |
| DE | 102006035292 | A1 | 1/2008 |
| DE | 202006020299 | U1 | 5/2008 |
| DE | 102007037162 | A1 | 2/2009 |
| DE | 102008014274 | A1 | 8/2009 |

(56) References Cited

FOREIGN PATENT DOCUMENTS

| | | | |
|---|---|---|---|
| DE | 102008039838 | A1 | 3/2010 |
| DE | 102005036929 | B4 | 6/2010 |
| DE | 102008062763 | B3 | 7/2010 |
| DE | 102009001894 | A1 | 9/2010 |
| DE | 102009035336 | B3 | 11/2010 |
| DE | 102009055988 | | 3/2011 |
| DE | 102010032726 | B3 | 11/2011 |
| DE | 102010032725 | A1 | 1/2012 |
| DE | 202011051975 | U1 | 2/2013 |
| DE | 102012107544 | B3 | 5/2013 |
| DE | 102012109481 | A1 | 4/2014 |
| EP | 0546784 | A2 | 6/1993 |
| EP | 0667549 | A2 | 8/1995 |
| EP | 0727642 | A1 | 8/1996 |
| EP | 0730210 | A1 | 9/1996 |
| EP | 0614517 | | 3/1997 |
| EP | 0838696 | A1 | 4/1998 |
| EP | 0949524 | A1 | 10/1999 |
| EP | 1160539 | | 12/2001 |
| EP | 1189124 | A1 | 3/2002 |
| EP | 0767357 | B1 | 5/2002 |
| EP | 1310764 | A2 | 5/2003 |
| EP | 1342989 | A2 | 9/2003 |
| EP | 1347267 | A1 | 9/2003 |
| EP | 1361414 | A1 | 11/2003 |
| EP | 1452279 | | 9/2004 |
| EP | 1468791 | A1 | 10/2004 |
| EP | 1056987 | B1 | 4/2005 |
| EP | 1528410 | A1 | 5/2005 |
| EP | 1669713 | A1 | 6/2006 |
| EP | 1734425 | | 12/2006 |
| EP | 1429109 | B1 | 4/2007 |
| EP | 1764579 | | 12/2007 |
| EP | 1878543 | A2 | 1/2008 |
| EP | 1967930 | A2 | 9/2008 |
| EP | 2003419 | A1 | 12/2008 |
| EP | 2023077 | A1 | 2/2009 |
| EP | 2042905 | A1 | 4/2009 |
| EP | 2060530 | A1 | 5/2009 |
| EP | 2068067 | A1 | 6/2009 |
| EP | 2068114 | | 6/2009 |
| EP | 2108917 | A1 | 10/2009 |
| EP | 2177868 | A2 | 4/2010 |
| EP | 2259013 | A1 | 12/2010 |
| EP | 2400261 | A1 | 12/2011 |
| FR | 2603228 | A1 | 3/1988 |
| FR | 2935043 | A1 | 2/2010 |
| GB | 894320 | | 4/1962 |
| GB | 1112941 | | 5/1968 |
| GB | 2222695 | A | 3/1990 |
| GB | 2255648 | A | 11/1992 |
| GB | 2336493 | A | 10/1999 |
| GB | 2341203 | A | 3/2000 |
| GB | 2388661 | A | 11/2003 |
| GB | 2420241 | A | 5/2006 |
| GB | 2447258 | A | 9/2008 |
| GB | 2452033 | A | 2/2009 |
| JP | 5581525 | | 6/1955 |
| JP | 575584 | A | 1/1982 |
| JP | 58171291 | A | 1/1983 |
| JP | 5827264 | | 2/1983 |
| JP | S58171291 | A | 10/1983 |
| JP | 59133890 | A | 8/1984 |
| JP | 61062885 | A | 3/1986 |
| JP | S61157095 | A | 7/1986 |
| JP | 63135814 | A | 6/1988 |
| JP | 0357911 | A | 3/1991 |
| JP | 04115108 | A | 4/1992 |
| JP | 04225188 | | 8/1992 |
| JP | 04267214 | A | 9/1992 |
| JP | 0572477 | A | 3/1993 |
| JP | 06313710 | A | 11/1994 |
| JP | 1994313710 | A | 11/1994 |
| JP | 06331733 | | 12/1994 |
| JP | 06341838 | | 12/1994 |
| JP | 074950 | A | 1/1995 |
| JP | 07128051 | A | 5/1995 |
| JP | 7210586 | A | 8/1995 |
| JP | 07229963 | A | 8/1995 |
| JP | 0815413 | A | 1/1996 |
| JP | 0821714 | A | 1/1996 |
| JP | 08129145 | A | 5/1996 |
| JP | 08136849 | A | 5/1996 |
| JP | 08262140 | A | 10/1996 |
| JP | 0921868 | | 1/1997 |
| JP | 10213661 | A | 8/1998 |
| JP | 1123993 | A | 1/1999 |
| JP | 2001056275 | A | 8/1999 |
| JP | 2000121724 | A | 4/2000 |
| JP | 2000249546 | A | 9/2000 |
| JP | 2000339468 | A | 12/2000 |
| JP | 2001013001 | A | 1/2001 |
| JP | 2001021303 | A | 1/2001 |
| JP | 2011066211 | A | 3/2001 |
| JP | 2001337278 | A | 12/2001 |
| JP | 2003050128 | A | 2/2003 |
| JP | 2003156330 | A | 5/2003 |
| JP | 2003156562 | A | 5/2003 |
| JP | 2003194526 | A | 7/2003 |
| JP | 2003202215 | A | 7/2003 |
| JP | 2003216255 | A | 7/2003 |
| JP | 2003308205 | A | 10/2003 |
| JP | 2004109106 | A | 4/2004 |
| JP | 2004245832 | A | 9/2004 |
| JP | 2004257927 | A | 9/2004 |
| JP | 2004333398 | A | 11/2004 |
| JP | 2004348575 | A | 12/2004 |
| JP | 2005030937 | A | 2/2005 |
| JP | 2005055226 | A | 3/2005 |
| JP | 2005069700 | A | 3/2005 |
| JP | 2005174887 | A | 6/2005 |
| JP | 2005517908 | | 6/2005 |
| JP | 2005215917 | A | 8/2005 |
| JP | 2005221336 | A | 8/2005 |
| JP | 2005257510 | A | 9/2005 |
| JP | 2006038683 | A | 2/2006 |
| JP | 2006102176 | A | 4/2006 |
| JP | 2006203404 | A | 8/2006 |
| JP | 2006226948 | A | 8/2006 |
| JP | 2006241833 | A | 9/2006 |
| JP | 2006266821 | A | 10/2006 |
| JP | 2006301991 | A | 11/2006 |
| JP | 2007514943 | A | 6/2007 |
| JP | 2007178943 | A | 7/2007 |
| JP | 2008076303 | A | 4/2008 |
| JP | 2008082707 | A | 4/2008 |
| JP | 2008096123 | A | 4/2008 |
| JP | 2008107286 | A | 5/2008 |
| JP | 2008304220 | A | 12/2008 |
| JP | 2009063339 | A | 3/2009 |
| JP | 2009524057 | | 6/2009 |
| JP | 2009531674 | A | 9/2009 |
| JP | 2009229255 | A | 10/2009 |
| JP | 2009541758 | A | 11/2009 |
| JP | 2010169405 | A | 8/2010 |
| JP | 2013516928 | A | 5/2013 |
| JP | 2013517508 | A | 5/2013 |
| JP | 2013117417 | A | 6/2013 |
| JP | 2013543970 | A | 12/2013 |
| WO | 8801924 | A1 | 3/1988 |
| WO | 8905512 | A1 | 6/1989 |
| WO | 9208568 | A1 | 5/1992 |
| WO | 9711399 | | 3/1997 |
| WO | 9808050 | A1 | 2/1998 |
| WO | 9910706 | A1 | 3/1999 |
| WO | 0014474 | | 3/2000 |
| WO | 0020880 | A2 | 4/2000 |
| WO | 0026612 | A1 | 5/2000 |
| WO | 0033149 | | 6/2000 |
| WO | 0034733 | | 6/2000 |
| WO | 0063645 | A1 | 10/2000 |
| WO | 0063681 | A2 | 10/2000 |
| WO | 0177613 | A1 | 10/2001 |
| WO | 02084327 | A2 | 10/2002 |

(56) References Cited

FOREIGN PATENT DOCUMENTS

| | | | |
|---|---|---|---|
| WO | 02101323 | A2 | 12/2002 |
| WO | 2004096502 | A1 | 11/2004 |
| WO | 2005008271 | A2 | 1/2005 |
| WO | 2005059473 | A2 | 6/2005 |
| WO | 2005072917 | A1 | 8/2005 |
| WO | 2005075875 | | 8/2005 |
| WO | 2005100908 | A1 | 10/2005 |
| WO | 2006000552 | A1 | 1/2006 |
| WO | 2006014445 | A1 | 2/2006 |
| WO | 2006051264 | A1 | 5/2006 |
| WO | 2006053837 | A1 | 5/2006 |
| WO | 2007002319 | A1 | 1/2007 |
| WO | 2007012198 | A1 | 2/2007 |
| WO | 2007028941 | | 3/2007 |
| WO | 2007051972 | A1 | 5/2007 |
| WO | 2007087198 | A1 | 8/2007 |
| WO | 2007118478 | A1 | 10/2007 |
| WO | 2007125081 | A1 | 11/2007 |
| WO | 2007144906 | A1 | 12/2007 |
| WO | 2008019856 | A1 | 2/2008 |
| WO | 2008027588 | A2 | 3/2008 |
| WO | 2008047171 | A1 | 4/2008 |
| WO | 2008048424 | A2 | 4/2008 |
| WO | 2008052348 | A1 | 5/2008 |
| WO | 2008064276 | A3 | 5/2008 |
| WO | 2008066896 | | 6/2008 |
| WO | 2008068791 | A1 | 6/2008 |
| WO | 2008075170 | A1 | 6/2008 |
| WO | 2008121073 | A1 | 10/2008 |
| WO | 2008157061 | A1 | 12/2008 |
| WO | 2009001165 | A1 | 12/2008 |
| WO | 2009016185 | A1 | 2/2009 |
| WO | 2009053085 | A1 | 4/2009 |
| WO | 2009083452 | A1 | 7/2009 |
| WO | 2009095384 | A2 | 8/2009 |
| WO | 2009123278 | A1 | 10/2009 |
| WO | 2009127526 | A1 | 10/2009 |
| WO | 2009130169 | A1 | 10/2009 |
| WO | 2009149740 | A1 | 12/2009 |
| WO | 2010040742 | A1 | 4/2010 |
| WO | 2010092131 | A1 | 8/2010 |
| WO | 2010108089 | A2 | 9/2010 |
| WO | 2010108644 | A1 | 9/2010 |
| WO | 2010148525 | A1 | 12/2010 |
| WO | 2011000435 | A1 | 1/2011 |
| WO | 2011000955 | A1 | 1/2011 |
| WO | 2011021103 | A1 | 2/2011 |
| WO | 2011029140 | A1 | 3/2011 |
| WO | 2011057130 | A2 | 5/2011 |
| WO | 2011060899 | A1 | 5/2011 |
| WO | 2011002908 | A1 | 6/2011 |
| WO | 2011090829 | A2 | 7/2011 |
| WO | 2011090895 | A1 | 7/2011 |
| WO | 2012037157 | A2 | 3/2012 |
| WO | 2012038446 | A1 | 3/2012 |
| WO | 2012061122 | A1 | 5/2012 |
| WO | 2012013525 | A2 | 8/2012 |
| WO | 2012103525 | A2 | 8/2012 |
| WO | 2012112683 | A2 | 8/2012 |
| WO | 2012125671 | A1 | 9/2012 |
| WO | 2013112455 | A1 | 8/2013 |
| WO | 2013188026 | A1 | 12/2013 |
| WO | 2013190031 | A1 | 12/2013 |
| WO | 2014128498 | A2 | 8/2014 |

OTHER PUBLICATIONS

Decision Revoking the European Patent (Art. 101(3)(b) EPC) dated Aug. 14, 2013, filed in Opposition re Application No. 07 785 873.6/ Patent No. 2 062 069, Proprietor: Faro Technologies, Inc., filed by Leica Geosystem AG on Feb. 5, 2013, 12 pages.

Faro Laser Scanner LS, Recording Reality's Digital Fingerprint, The Measure of Success, Rev. Aug. 22, 2005.

Faro Laserscanner LS, Presentation Forensic Package, Policeschool of Hessen, Wiesbaden, Germany, Dec. 14, 2005; Faro Technologies, Copyright 2008.

Haag, et al., "Technical Overview and Application of 3D Laser Scanning for Shooting Reconstruction and Crime Scene Investigations", Presented at the American Academy of Forensic Sciences Scientific Meeting, Washington, D.C., Feb. 21, 2008.

Howard, et al., "Virtual Environments for Scene of Crime Reconstruction and Analysis", Advanced Interfaces Group, Department of Computer Science, University of Manchester, Manchester, UK, Feb. 28, 2000.

Ingensand, H., Dr., "Introduction to Geodetic Metrology", "Einfuhrung in die Geodatische Messtechnik", Federal Institute of Technology Zurich, 2004, with English translation.

Langford, et al., "Practical Skills in Forensic Science", Pearson Education Limited, Essex, England, First Published 2005, Forensic Chemistry.

Leica Geosystems, FBI Crime Scene Case Study, Tony Grissim, Feb. 2006.

Leica Geosystems, TruStory Forensic Analysis by Albuquerque Police Department, 2006.

Leica TPS800 Performance Series—Equipment List, 2004.

Provision of a copy of the minutes in accordance with Rule 124(4) EPC dated Aug. 14, 2013, filed in Opposition re Application No. 07 785 873.6/Patent No. 2 062 069, Proprietor: Faro Technologies, Inc., filed by Leica Geosystem AG on Feb. 5, 2013.

Se, et al., "Instant Scene Modeler for Crime Scene Reconstruction", MDA, Space Missions, Ontario, Canada, Copyright 2005, IEEE.

The Scene, Journal of the Association for Crime Scene Reconstruction, Apr.-Jun. 2006, vol. 12, Issue 2.

Huebner, Siegfried F., "Sniper Shooting Techniques, Schartschutzen-Schiesstechnik", 1989, with English Translation.

Davidson, A. et al., "MonoSLAM: Real-Time Single Camera SLAM", IEEE Transactions on Pattern Analysis and Machine Intelligence, vol. 29, No. 6, Jun. 1, 2007, pp. 1052-1067, XP011179664.

Gebre, Biruk A., et al., "Remotely Operated and Autonomous Mapping System (ROAMS)", Technologies for Practical Robot Applications, TEPRA 2009, IEEE International Conference on Nov. 9, 2009, pp. 173-178, XP031570394.

Harrison A. et al., "High Quality 3D Laser Ranging Under General Vehicle Motion", 2008 IEEE International Conference on Robotics and Automation, May 19-23, 2008, pp. 7-12, XP031340123.

May, S. et al, "Robust 3D-Mapping with Time-of-Flight Cameras", Intelligent Robots and Systems, IROS 2009, IEEE/RSJ International Conference on Oct. 10, 2009, pp. 1673-1678, XP031581042.

Ohno, K. et al., "Real-Time Robot Trajectory Estimation and 3D Map Construction Using 3D Camera", Intelligent Robots and Systems, 2006 IEEE/RSJ International Conference on Oct. 1, 2006, pp. 5279-5285, XP031006974.

Surmann, H. et al., "An Autonomous Mobile Robot with a 3D Laser Range Finder for 3D Exploration and Digitalization of Indoor Environments", Robotics and Autonomous Systems, Elsevier Science Publishers, vol. 45, No. 3-4, Dec. 31, 2003, pp. 181-198.

Yan, R., et al, "3D Point Cloud Map Construction Based on Line Segments with Two Mutually Perpendicular Laser Sensors", 2013 13th International Conference on Control, Automation and Systems (ICCAS 2013), IEEE, Oct. 20, 2013, pp. 1114-1116.

Ye, C. et al., "Characterization of a 2-D Laser Scanner for Mobile Robot Obstacle Negotiation" Proceedings / 2002 IEEE International Conference on Robotics and Automation, May 11-15, 2002, Washington, D.C., May 1, 2002, pp. 2512-2518, XP009169742.

YK Cho, et al. "Light-weight 3D LADAR System for Construction Robotic Operations" (pp. 237-244); 26th International Symposium on Automation and Robotics in Construction (ISARC 2009), Jun. 24, 2009.

Williams, J.A., et al., Evaluation of a Novel Multiple Point Set Registration Algorithm, Copyright 2000, [Retrieved on Jan. 18, 2010 at 04:10 from IEEE Xplore].

Hart, A., "Kinematic Coupling Interchangeability", Precision Engineering, vol. 28, No. 1, Jan. 1, 2004, pp. 1-15, XP55005507, ISSN: 0141-6359, DOI: 10.1016/S0141-6359(03)00071-0.

HYDROpro Navigation, Hydropgraphic Survey Software, Trimble, www.trimble.com, Copyright 1997-2003.

(56) References Cited

OTHER PUBLICATIONS

Information on Electro-Optical Information Systems; EOIS 3D Mini-Moire C.M.M. Sensor for Non-Contact Measuring & Surface Mapping; Direct Dimensions, Jun. 1995.
iQsun Laserscanner Brochure, 2 pages, Apr. 2005.
It is Alive in the Lab, Autodesk University, Fun with the Immersion MicroScribe Laser Scanner, [online], [retrieved Nov. 29, 2011], http://labs.blogs.com/its_alive_in_the_lab/2007/11/fun-with-the-im.html; 3 pages.
J. Geng "Structured-Light 3D Surface Imaging: A Tutorial," Advances in Optics and Photonics 3; Mar. 31, 2011, pp. 128-160; IEEE Intelligent Transportation System Society; 2011 Optical Society of America.
Jasiobedzki, Piotr, "Laser Eye—A New 3D Sensor for Active Vision", SPIE—Sensor Fusion VI, vol. 2059, Sep. 7, 1993, pp. 316-321, XP00262856, Boston, U.S.A., Retrieved from the Internet: URL:http:.//scitation.aip.org/getpdf/servlet/Ge.
Jasperneite, et al., Enhancements to the Time Synchronization Standard IEEE-1588 for a System of Cascaded Bridges, IEEE, 2004.
JGeng "DLP-Based Structured Light 3D Imaging Technologies and Applications" (15 pages) Emerging Digital Micromirror Device Based Systems and Application III; edited by Michael R. Douglass, Patrick I. Oden, Proc. of SPIE, vol. 7932, 79320B; (2011) SPIE.
Umeda, K., et al., Registration of Range and Color Images Using Gradient Constraints and Ran Intensity Images, Proceedings of the 17th International Conference on Pattern Recognition (ICPR'04), Copyright 2010 IEEE. [Retrieved online Jan. 28, 2010—IEEE.
Kreon Laser Scanners, Getting the Best in Cutting Edge 3D Digitizing Technology, B3-D MCAD Consulting/Sales [online], [retrieved Nov. 29, 2011], http://www.b3-d.com/Kreon.html.
Laser Reverse Engineering with Microscribe, [online], [retrieved Nov. 29, 2011], http://www.youtube.com/watch?v=8VRz_2aEJ4E &feature=PlayList&p=F63ABF74F30DC81B&playnext=1 &playnext_from=PL&index=1.
Leica Geosystems: "Leica Rugby 55 Designed for Interior Built for Construction", Jan. 1, 2009, XP002660558, Retrieved from the Internet: URL:http://www.leica-geosystems.com/downloads123/zz/lasers/Rugby%2055/brochures/Leica_Rugby_55_brochure_en.pdf [re.
Leica Rugby 55 Designed for Interior Built for Construction Brochure, Leica Geosystems, Heerbrugg, Switzerland, www.leica-geosystems.com.
Merriam-Webster (m-w.com), "Interface". 2012. http://www.merriam-webster.com/dictionary/interface.
Merriam-Webster (m-w.com), "Parts". 2012. http://www.merriam-webster.com/dictionary/parts.
Merriam-Webster (m-w.com), "Traverse". 2012. http://wvvw.merriam-webster.com/dictionary/traverse.
MG Lee; "Compact 3D LIDAR based on optically coupled horizontal and vertical Scanning mechanism for the autonomous navigation of robots" (13 pages) vol. 8037; downloaded from http://proceedings.spiedigitallibrary.org/ on Jul. 2, 2013.
MicroScan 3D User Guide, RSI GmbH, 3D Systems & Software, Oberursel, Germany, email: info@rsi-gmbh.de, Copyright RSI Roland Seifert Imaging GmbH 2008.
Moog Components Group "Technical Brief; Fiber Optic Rotary Joints" Document No. 303 (6 pages) Mar. 2008; MOOG, Inc. 2008 Canada; Focal Technologies.
Moog Components Group; "Fiber Optic Rotary Joints; Product Guide" (4 pages) Dec. 2010; MOOG, Inc. 2010.
Non-Final Office Action, Issued Mar. 23, 2015.
P Ben-Tzvi, et al "Extraction of 3D Images Using Pitch-Actuated 2D Laser Range Finder for Robotic Vision" (6 pages) BNSDOCID <XP 31840390A_1_>, Oct. 15, 2010.
Trimble—Trimble SPS630, SPS730 and SPS930 Universal Total Stations, [on-line] http://www.trimble.com/sps630_730_930.shtml (1 of 4), [Retreived Jan. 26, 2010 8:50:29AM].
Romer "Romer Absolute Arm Maximum Performance Portable Measurement" (Printed 2010); Hexagon Metrology, Inc., http://us:Romer.com; 2010.
Surman et al. "An autonomous mobile robot with a 3D laser range finder for 3D exploration and digitalization of indoor environments." Robotics and Autonomous Systems vol. 45 No. 3-4, Dec. 31, 2003, pp. 181-198. Amsterdamn, Netherlands.
Willoughby, P., "Elastically Averaged Precisoin Alignment", In: "Doctoral Thesis", Jun. 1, 2005, Massachusetts Institute of Technology, XP55005620, abstract 1.1 Motivation, Chapter 3, Chapter 6.
Romer "Romer Absolute Arm Product Brochure" (2010); Hexagon Metrology; www.hexagonmetrology.com; Hexagon AB 2010.
Romer "Romer Measuring Arms Portable CMMs for R&D and shop floor" (Mar. 2009) Hexagon Metrology (16 pages).
Romer Measuring Arms; Portable CMMs for the shop floor; 20 pages; Hexagon Metrology, Inc. (2009) http//us.Romer.com.
RW Boyd "Radiometry and the Detection of Otpical Radiation" (pp. 20-23) 1983 Jon wiley & Sons, Inc.
Sauter, et al., Towards New Hybrid Networks for Industrial Automation, IEEE, 2009.
Spada, et al., IEEE 1588 Lowers Integration Costs in Continuous Flow Automated Production Lines, XP-002498255, ARC Insights, Insight # 2003-33MD&H, Aug. 20, 2003.
International Search Report for International Application No. PCT/EP2007/005789 mailed Oct. 30, 2007.

* cited by examiner

METHOD AND AN APPARATUS FOR CAPTURING THREE-DIMENSIONAL DATA OF AN AREA OF SPACE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE

This is a U.S. national stage of application No. PCT/EP2007/005789, filed on 29 Jun. 2007. Priority under 35 U.S.C. §119(a) and 35 U.S.C. §365(b) is claimed from German Application No. 10 2006 031 580.4, filed 3 Jul. 2006, the disclosure of which is also incorporated herein by reference.

BACKGROUND OF THE INVENTION

The present invention relates to a method for capturing three-dimensional data of an area of space, comprising the steps of:

- providing a laser scanner having a transmitter and a receiver,
- sending out a plurality of measuring beams by means of the transmitter to a plurality of measuring points in the area of space,
- receiving a plurality of reflected beams which are reflected by the measuring points, and
- determining a plurality of distances to the plurality of measuring points as a function of the reflected beams.

The invention also relates to an apparatus for capturing three dimensional data of an area of space, comprising a laser scanner having a transmitter and a receiver, the transmitter being configured for sending out a plurality of measuring beams to a plurality of measuring points in the area of space, the receiver being configured for receiving a plurality of reflected beams which are reflected by the measuring points and for determining a plurality of distances to the plurality of measuring points as a function of the reflected beams.

Such a method and such an apparatus are known, for example, from DE 103 61 870 B4.

This document discloses a laser scanner comprising a measuring head which holds a rotor rotatably supported. The rotor is rotated about a horizontal axis whilst sending out a plurality of laser beams. Due to the rotation of the rotor, the laser beams are sent out into a plurality of directions in space which cover an elevation angle of 270° or more. In addition, the measuring head is rotated about a vertical axis so that the laser beams sent out almost completely scan the surrounding area of space. In the measuring head, a receiver is arranged which receives the reflected beams reflected from object points in the area of space and which determines the distances to the object points by means of a difference in delay time between the beams sent out and the received beams. In addition, the receiver generates for each measuring point a gray scale value which depends on the intensity of the reflected measuring beam. Altogether, this known laser scanner can be used for recording a three-dimensional image of an area of space, the plurality of gray scale values producing an all-rotund image which is comparable to a black/white recording of the area of space. In addition, a distance information item is provided for each measuring point so that the area of space can be examined more accurately, surveyed and/or documented later by means of the recorded data. A typical application for such a laser scanner is the surveying of factory halls in which, for example, a new production line is to be planned and set up. In another known application, such a laser scanner is moved through a tunnel tube (if necessary without rotation about the vertical axis) in order to check, e.g., the state of the tunnel and determine the clear width at every point in the tunnel.

In principle, such a laser scanner is suitable for capturing three-dimensional data of any area of space which is bounded by objects such as walls or natural obstacles. The relatively fast and extensive data acquisition including an "optical image" of the area of space in an all-round view also allows such a laser scanner to be advantageous for forensic applications, i.e. the coverage and documentation of crime scenes. However, forensic coverage of a crime scene requires further information which cannot be supplied by laser scanners hitherto known. This includes primarily information about the location and the course of bullet channels produced when a projectile penetrates into a wall or into another obstacle.

For the forensic coverage of bullet channels, rods marked with [colours] *colors* are used today which rods are inserted into a bullet channel in such a manner that a [proximal end] *proximal-portion* of the rods [protrudes] *protrude* from the entry opening of the bullet channel. These rods can be used for identifying the orientation of the bullet channel. Suitable rods are offered, for example, by the Lightning Powder Company, Inc., 13386 International Parkway, Jacksonville, Fla. 32218, USA.

Against this background, it is an object of the present invention to improve a method and an apparatus of the type initially mentioned in order to open up new applications. In particular, it is an object of the invention to facilitate the forensic data capture of an area of space.

SUMMARY OF THE INVENTION

According to one aspect of the present invention, this object is achieved by a method of the type initially mentioned in which the area of space comprises at least one object which contains a hidden channel having a visible entry opening, a rod-shaped element being inserted into the channel in such a manner that a [free end] *proximal portion freely* protrudes from the entry opening, a first distance to a first measuring point at the [free end] *proximal portion* and at least one second distance to a second measuring point at the [free end] *proximal portion* are determined, and an orientation of the hidden channel is determined as a function of the first and second distances.

According to another aspect of the invention, this object is achieved by an apparatus of the type initially mentioned in which the receiver is also configured for determining an orientation of a rod-shaped element having a [free end] *proximal portion* which protrudes from an entry opening of a hidden channel at an object in the area of space by the receiver determining a first distance to a first measuring point at the [free end] *proximal portion* and at least one second distance to a second measuring point at the [free end] *proximal portion*.

The present invention can be used for determining the orientation of a bullet channel or any other channel hidden in an object from the data which are acquired by means of the laser scanner. The capabilities of the known laser scanner are extended because the laser scanner, somehow, can "look into" the object by means of the rod-shaped element. As can be easily understood, the novel method and the novel apparatus are particularly well suited for the forensic data capture of crime scenes in which firearms were used. In addition, however, the novel method and the novel apparatus can also be used for other purposes in which the orientation of a channel hidden in an object is to be documented and surveyed, for example for documenting drilled holes in building walls.

The novel method and the novel apparatus have the advantage that the orientation of the channel can be determined very rapidly and with high accuracy, the data for determining the orientation being acquired at the same time as the "remaining" area of space is measured three-dimensionally. It is particularly advantageous that the orientation of the channel can be marked in the "optical image" of the area of space which facilitates documentation and later analysis.

The above-mentioned object is thus completely achieved.

In a preferred embodiment of the invention, the rod shaped element has a rod-shaped distal [area] *portion* and a proximal [area] *portion*, the rod-shaped distal [area] *portion* being configured for insertion into the hidden channel and the proximal [area] *portion* having at least one enlarged body at which the first and second measuring [point] *points* are arranged. The first and second measuring point are preferably arranged at a relative distance from one another along the rod-shaped element, the relative distance preferably being approximately 10 cm or more. The distal [area] *portion* preferably has an outside diameter between about 0.2 cm and 1 cm. The outside diameter of the enlarged body is preferably between about 2 cm and 15 cm, furthermore preferably between about 5 cm and 10 cm.

Providing the rod-shaped element with a relatively thin distal [area] *portion* and a thickened proximal [area] *portion* facilitates precise and unambiguous determination of the orientation. The relatively thin distal [end] *portion* enables the rod-shaped element to be inserted into narrow bullet channels, drilled holes etc. On the other hand, the enlarged body at the proximal [area] *portion* facilitates unambiguous identification of the rod-shaped element and thus a more reliable and accurate determination of the orientation. This was not to be expected at the beginning because an increase in measuring accuracy is typically achieved by means of a "fine" measuring instrument. In the present embodiment, however, an enlarged body is used which exceeds the dimensions of the hidden channel by 10- to 20-times in preferred embodiments. However, it has been found that the enlarged body can be surveyed in its own dimensions due to the three-dimensional coverage of the area of space which then enables the orientation to be determined mathematically with increased accuracy.

In a further embodiment, the distal [area] *portion* defines a longitudinal axis and the at least one body has a center point which is essentially located on the longitudinal axis.

In this embodiment, the body is arranged approximately coaxially with respect to the distal [area] *portion* of the rod-shaped element. This facilitates the exact determination of the orientation. In addition, the rotational position of the rod-shaped element about its longitudinal axis is not important in this embodiment so that the rod-shaped element can be positioned in the channel in a simpler and quicker manner.

In a further embodiment, a plurality of body distances to a plurality of measuring points at the at least one body are determined and the center point is determined as a function of the plurality of body distances.

In this embodiment, the body itself is surveyed in order to determine its center point as precisely as possible. The more accurately it is possible to determine the center point of the body, the more accurately it is possible to determine the orientation of the hidden channel.

In a preferred refinement of this embodiment, the body has a defined geometric shape and an ideal image of this geometric shape is matched to a cloud of points which represents the plurality of body distances. For example, the matching can take place in accordance with the method of least squares. This embodiment enables the orientation of the hidden channel to be determined accurately even when the surveying of the body is burdened with high measurement noise.

In a further embodiment, each reflected beam has a beam intensity and the orientation is also determined as a function of the beam intensities.

In this embodiment, it is not only the distance information but also the beam intensities which are used for determining the position and alignment of the at least one body. Since the accuracy with which the orientation can be determined depends on the accuracy with which the body is surveyed, this embodiment enables the measuring accuracy to be further improved.

In a further embodiment, the at least one body has an elongated shape, particularly a cylindrical shape.

In this embodiment, the body has a defined main direction which is advantageously coaxial with the orientation sought. Using such a body facilitates the determination of the orientation and increases the measuring accuracy. The longer the elongated shape, the more it is possible to detect measuring points which are further apart by means of the laser scanner. Measuring points which are far apart reduce measuring errors which can be produced due to tolerances and/or measurement noise.

In a further embodiment, the rod-shaped element comprises at least two bodies which are arranged at a relative distance from one another.

This embodiment, too, provides for measuring points which are far apart on the rod-shaped element and, in consequence, a reduction in measuring errors. This embodiment is particularly advantageous if the at least two bodies have the same shape because identical algorithms can then be used for determining the center [point] *points*. Compared with a single elongated body, this embodiment has the advantage that the [free] *freely protruding* proximal [end] *portion* is loaded by a lighter weight which reduces bending of the rod-shaped element.

In a further embodiment, the at least two bodies are spheres. As an alternative, the at least two bodies can be cubes or other geometric elements.

Spheres enable the center point to be determined in a relatively simple and precise manner which is largely independent of the direction of view or the angle of view of the laser scanner. Spheres are therefore generally preferred as bodies. By comparison, cubic bodies have the advantage that the rod shaped element cannot roll away which facilitates practical handling and transportation.

In a further embodiment, the hidden channel is a bullet channel and an assumed position of a gunman within the area of space is determined as a function of the orientation. The determination of the assumed position is advantageously automatic by looking for a position which approximately corresponds to the size of a gunman along the orientation.

This embodiment represents a particularly preferred application of the novel method and of the novel apparatus because it simplifies and accelerates the forensic data capture of a crime scene.

In a further embodiment, the rod-shaped element comprises a marking *80* (*see FIG. 3, for example*) in the distal [area] *portion 68*, which marking *80* has more reflective and less reflective sections.

Using this embodiment, the depth of the hidden channel can be documented in a very simple manner since the sections with different reflectivity lead to different beam intensities of the reflected beams. Such a marking *80* is therefore clearly visible in the optical image and it can be identified in a relatively quick and simple manner in the recorded data.

It goes without saying that the features mentioned above and those yet to be explained in the following can be used not only in the combination specified in each case but also in other combinations or by themselves without departing from the scope of the present invention.

BRIEF DESCRIPTION OF THE DRAWINGS

Illustrative embodiments of the invention are shown in the drawing and will be explained in greater detail in the following description.

DETAILED DESCRIPTION OF THE INVENTION

Figure 1:
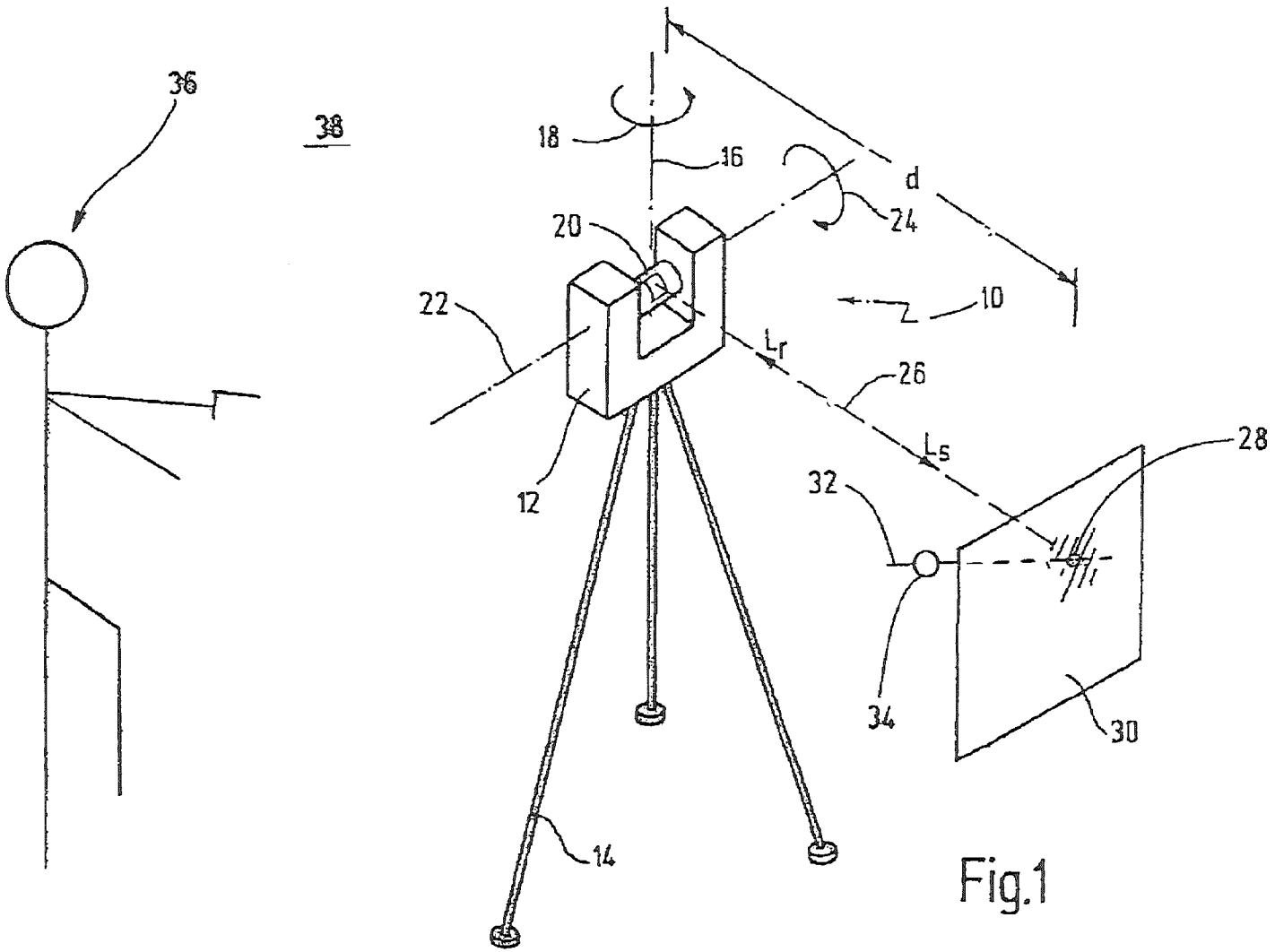
FIG. 1 shows a simplified representation of a preferred illustrative embodiment of the invention.

In FIG. 1, a laser scanner according to an embodiment of the present invention is designated by the reference number 10 overall. The laser scanner 10 has a measuring head 12 which is arranged on a tripod 14 in this case. The measuring head 12 can be rotated on the tripod 14 about a vertical axis 16 which is indicated by an arrow 18.

The measuring head 12 has an approximately U-shaped housing. Between the two housing legs, a rotor 20 is arranged which can be rotated about a horizontal axis 22 as is indicated by the arrow 24. The rotor 20 has an exit window from which a measuring beam Ls can emerge. The measuring beam Ls extends along a beam axis 26 to a measuring point 28 on an object 30. The measuring beam is reflected from the measuring point 28 and passes back to the measuring head 12 as reflected beam Lr where the reflected beam Lr encounters the rotor 20 and is detected by a detector, not shown here. From the time difference between sending out of the measuring beam Ls and the reception of the reflected beam Lr, the distance d between the laser scanner 10 and the measuring point 28 can be determined. The measuring beam Ls is advantageously modulated for determining the delay time.

According to a preferred embodiment of the invention, the measuring point 28 is located here in the area of an entry or exit opening of a channel (not shown here) which is hidden in the object 30. To determine the orientation of the channel, the novel apparatus comprises a rod-shaped element 32 which is inserted with a rod-shaped distal [end] *portion 68* (*best seen with reference to FIG. 2*) into the opening of the channel. At [the free] *a freely protruding* proximal [end] *portion 70* (*best seen with reference to FIG. 2*) of the rod-shaped element 32, a body in the form of a sphere 34 is arranged here.

Reference number 36 designates a person who stands at a position in the area of space 38 from which a shot has presumably been fired, the projectile of which has created the hidden channel in the object 30. This position can be determined from the orientation of the hidden channel by means of the novel method and the novel apparatus.

Figure 2:
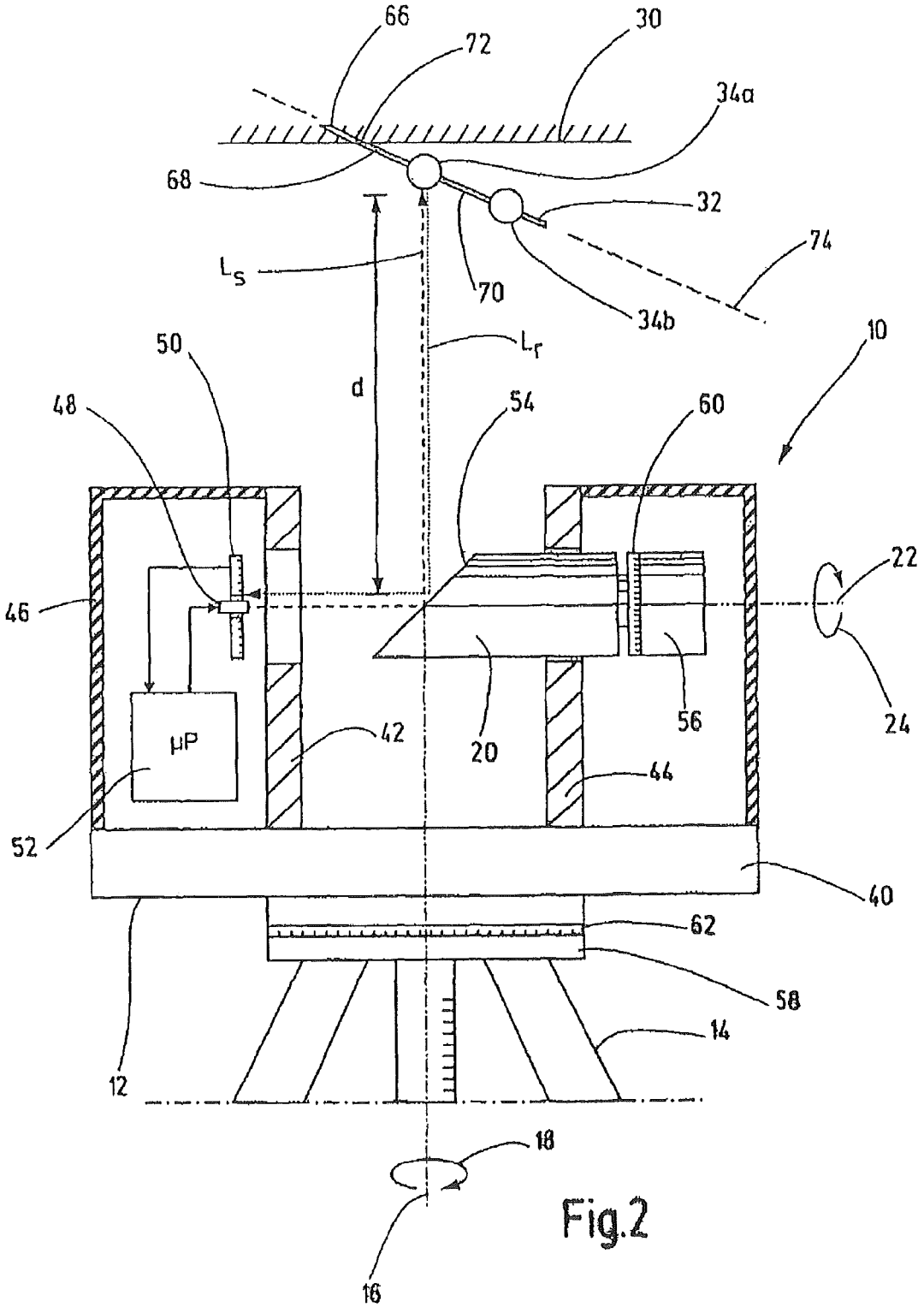
FIG. 2 shows a laser scanner which is used in the illustrative embodiment according to FIG. 1, in a partially cut side view.

FIG. 2 shows the laser scanner 10 and the rod-shaped element 32 in further detail. Identical reference symbols designate the same elements as before.

The measuring head 12 has a base 40 on which two support walls 42, 44 are arranged vertically. The support wall 42, together with a housing part 46, forms an internal space in which a light transmitter 48 and a detector 50 are arranged. The light transmitter 48 is here a laser diode, the detector 50 comprises a plurality of light-sensitive elements in a matrix-type arrangement.

Reference number 52 designates an evaluation and control unit which contains a PC-based computing unit in a preferred embodiment. The evaluation and control unit 52 drives the light transmitter 48 in such a manner that it generates a modulated measuring beam Ls. In addition, the evaluation and control unit 52 reads out the detector 50 for determining the distance d and the light intensity of the reflected light beam Lr.

The rotor 20 here carries a mirror 54 which is arranged opposite the transmitter 48 and the detector 50 and which is inclined by 45° with respect to the latter. The rotor 20 is connected to a drive 56 which produces a rotation of the mirror 54 about the horizontal axis 22. Due to this rotation, the measuring beam Ls is deflected along a vertical circular area in the area of space 38.

As already mentioned with respect to FIG. 1, the laser scanner 10 of the present embodiment has a further drive 58 which provides for a rotation of the measuring head 12 about the vertical axis 16. This allows the "vertical fan" spanned by means of the measuring beam Ls to be rotated within the area of space 38 so that the measuring beam Ls can illuminate virtually all object points in the environment of the laser scanner 10. In order to be able to correlate the distance and intensity information with the individual measuring points 28, the drives 56, 58 are provided with encoders 60, 62 by means of which the respective alignment of the measuring beam Ls is determined.

Reference number 66 designates a hidden channel in the object 30, for example a wall. According to an illustrative embodiment of the invention, the distal [end] *portion* 68 of the rod-shaped element 32 is pushed into the channel 66. The proximal [end] *portion* 70 of the rod-shaped element 32 protrudes from the entry or exit opening 72 of the channel 66. At the proximal [end] *portion* 70, two spheres 34a, 34b are arranged here as will still be described in greater detail by means of FIG. 3 in the text which follows.

The rod-shaped element 32 defines a longitudinal axis 74 which corresponds to the orientation of the hidden channel 66. This orientation can be determined in an automated manner by means of the two spheres 34a, 34b by determining the position of the two spheres 34a, 34b by means of the laser scanner 10. The positions of the spheres can be used for determining a vector which represents the orientation 74.

Figure 3:
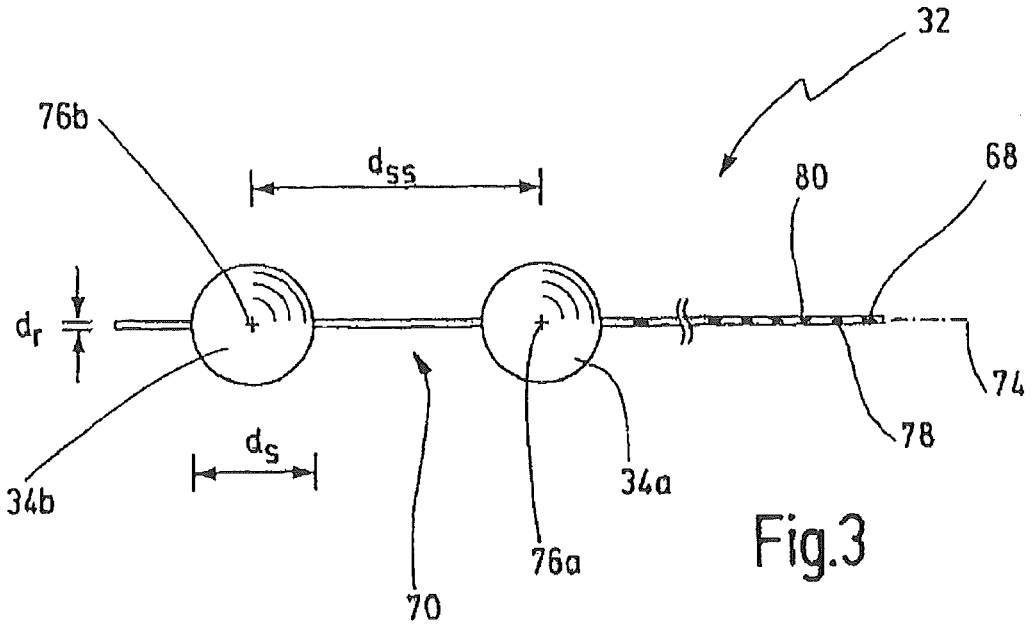
FIGS. 3 to 5 show various illustrative embodiments of rod-shaped elements according to the present invention.

FIG. 3 shows a preferred embodiment of the rod-shaped element 32. The element 32 has a distal [end] *portion* 68 which is configured for being inserted into the hidden channel. At the proximal [end] *portion* 70, two spheres 34a, 34b are arranged at a defined distance dss. The outside diameter dr of the rod is here about 0.5 mm. By comparison, the outside diameter ds of the spheres 34a, 34b is of an order of magnitude of about 5 to 10 cm. However, the spheres 34a, 34b can also be smaller or larger, spheres having a larger diameter being more easily identified in the measurement data of the laser scanner 10. On the other hand, spheres having a smaller diameter facilitate the handling of the element 32 and provide for a lesser weight at the [free] *freely protruding* proximal [end] *portion*.

In one illustrative embodiment, the spheres 34a, 34b are of polystyrene and are pushed onto the rod of the [rod] *rod-shaped* element 32. The spheres 34a, 34b can be movable on the rod or can be fixed in their respective position, for example by bonding.

Each sphere 34a, 34b has a center point 76a, 76b of the sphere which is determined in preferred illustrative embodiments of the novel method. As shown in FIG. 3, the center points 76a, 76b of the spheres are here located on the longitudinal axis 74, i.e. the rod of the rod-shaped element 32 passes centrally through the center points 76a, 76b of the spheres.

Figure 4:
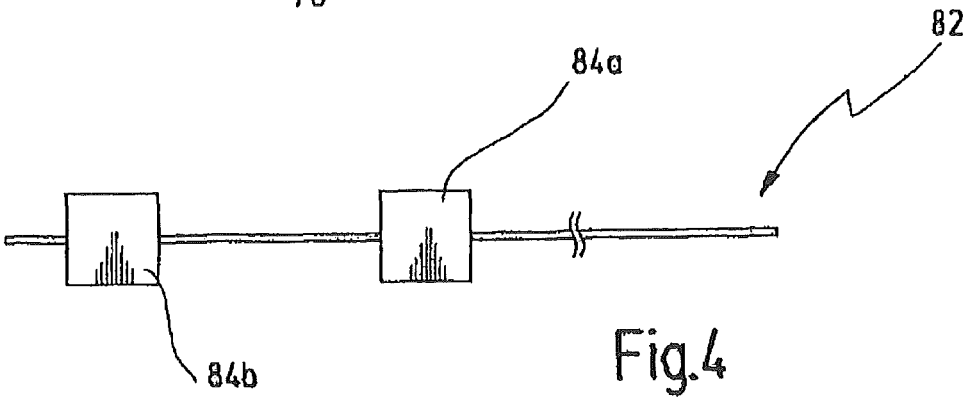

FIG. 4 shows a further illustrative embodiment of a rod-shaped element 82 which, in principle, corresponds to the element 32 from FIG. 3. However, the element 82 has cubic bodies 84a, 84b instead of the spheres 34a, 34b.

Figure 5:
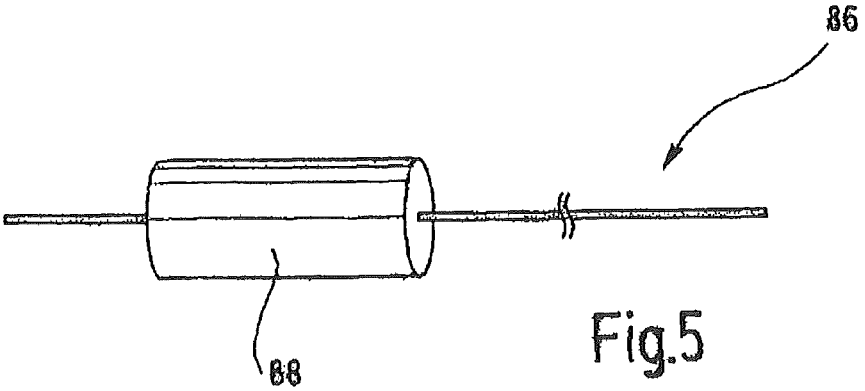

FIG. 5 shows a further illustrative embodiment of a rod-shaped element 86 which has only a single cylindrical body 88 in contrast to the two previous illustrative embodiments.

Figure 6:
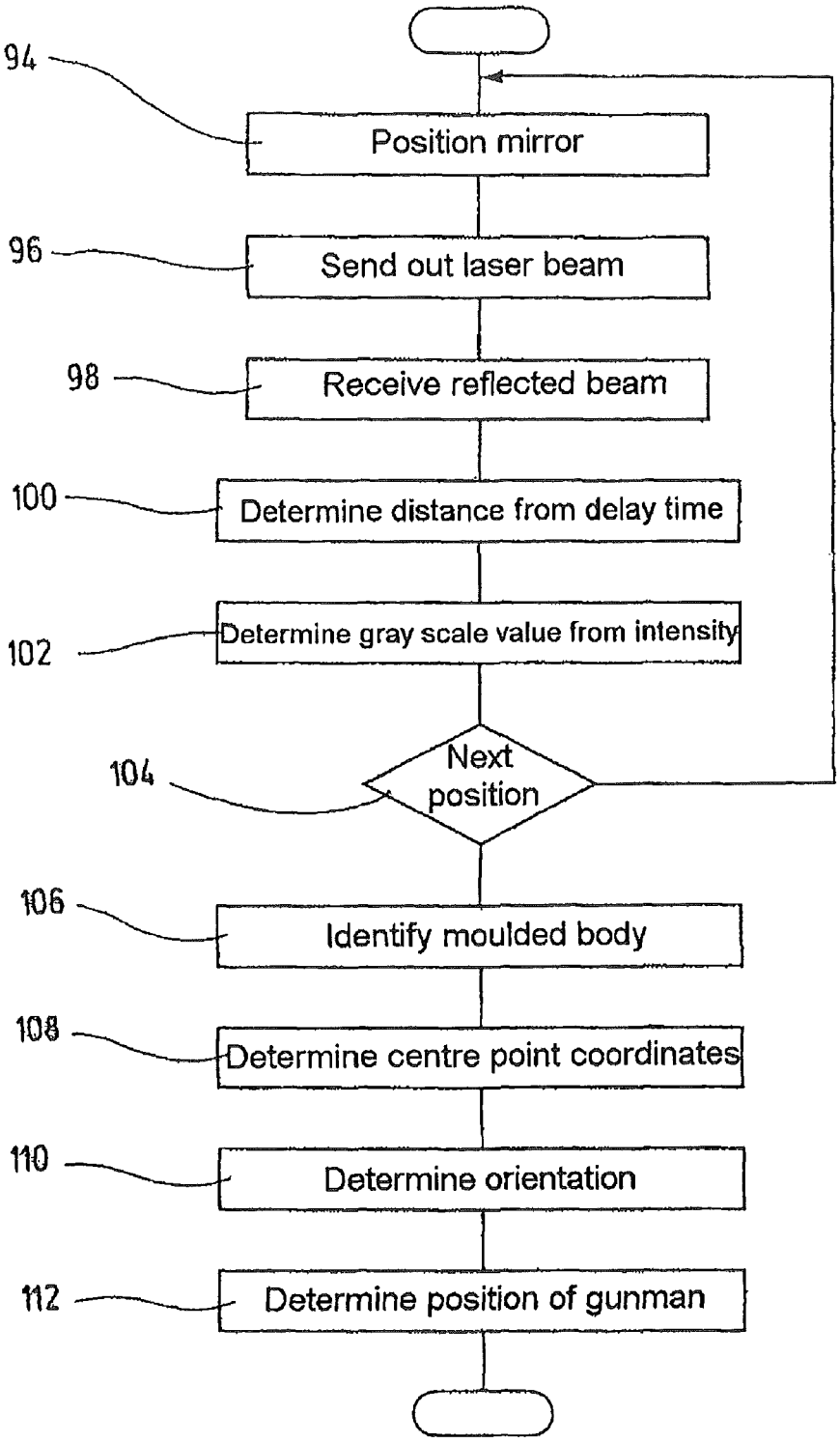
FIG. 6 shows a simplified flowchart for explaining an illustrative embodiment of the method according to the invention.

In the text which follows, a preferred illustrative embodiment of the novel method is described by means of FIG. 6. After all components have been set up and taken into operation, the mirror 54 is positioned according to step 94. According to step 96, the measuring beam Ls is sent out. According to step 98, the reflected beam Lr is received. According to step 100, the evaluation and control unit 52 is then used for determining the distance to the measuring point 28 from the delay time difference. In addition, a gray scale value is determined from the intensity of the reflected beam Lr according to step 102. According to step 104, this is repeated for all positions of the mirror 54 which can be adjusted by means of the two drives 56, 58, in order to obtain a 3D recording of the area of space 38.

Once all measurement data have been recorded, the body or bodies on the rod-shaped element *32*, such as, for example, the spheres 34a, 34b, is/are identified according to step 106. Following this, the coordinates of the center points 76a, 76b are determined according to step 108. In preferred embodiments, this is done by fitting ideal spheres into the "clouds of points" which were recorded by means of the laser scanner 10. For example, the fitting-in can take place in accordance with the method of least squares. Following this, the center point coordinates of the spheres fitted in are calculated.

From the center point coordinates calculated, the orientation 74 is determined according to step 110. Following this, the assumed position of the gunman who has fired a projectile which has formed the (bullet) channel 66 is determined according to step 112. For this purpose, a position or position range is sought along the orientation 74 at which a "typical height" above ground intersects the orientation 74. The typical height is within the range of between about 1 m and 1.80 m. As an alternative or additionally, the assumed position of the gunman can be determined by inserting an image of a person along the orientation 74 into the image of the area of space which was recorded by means of the laser scanner 10 (from the intensities of the reflected beams). In further illustrative embodiments, a person 36 can be recorded during the scanning of the area of space 38 so that the coordinates of the person 36 can be compared with the orientation 74.

The invention claimed is:

1. A method for capturing three-dimensional data of an area of space, comprising:

providing a laser scanner comprising a transmitter and a receiver, sending out a plurality of measuring beams (Ls) by means of the transmitter to a plurality of measuring points in the area of space, receiving a plurality of reflected beams (Lr) which are reflected by the measuring points, [and]

determining a plurality of distances to the plurality of measuring points as a function of the reflected beams (Lr),

*determining for each measuring point of the plurality of measuring points a gray scale value that depends on an intensity of respective ones of the plurality of reflected beams (Lr), and*

*recording a cloud of points, representative of the plurality of measuring points in the area of space, determined as a function of the plurality of distances and respective gray scale values,* wherein the area of space comprises at least one object which contains a hidden channel having a visible entry opening, a rod-shaped element being inserted into the channel in such a manner that a [free end] *proximal portion of the rod-shaped element* protrudes from the entry opening, [a first distance] *the rod-shaped element comprising a defined geometric shape having a first three-dimensional coordinate and at least one second three-dimensional coordinate in the area of space, an ideal image of the geometric shape being matched to the cloud of points that represents measuring points of the geometric shape, the first three-dimensional coordinate* to a first measuring point at the [free end] *proximal portion* and [at least one second distance] *the at least one second three-dimensional coordinate* to a second measuring point at the [free end] *proximal portion* being determined *using the ideal image that is matched to the cloud of points that represent measuring points of the geometric shape*, and an orientation of the hidden channel being determined as a function of *a vector between* the first and second [distance] *three-dimensional coordinates*.

2. The method according to claim 1, wherein the rod-shaped element has a rod-shaped distal [area and a proximal area] *portion*, the rod-shaped distal [area] *portion* being configured for insertion into the hidden channel and the proximal [area] *portion* having at least one enlarged body at which the first and second measuring points are arranged.

3. The method according to claim 2, wherein the distal [area] *portion* defines a longitudinal axis, and that the at least one body has a center point which is essentially located on the longitudinal axis.

4. The method according to claim 3, wherein a plurality of body distances to a plurality of measuring points at the at least one body are determined, and that the center point is determined as a function of the plurality of body distances.

5. The method according to claim 1, wherein each reflected beam (Lr) has a beam intensity, and the orientation is also determined as a function of the beam intensities.

6. The method according to claim [1] *2*, wherein the at least one body has an elongated shape, particularly a cylindrical shape.

7. The method according to claim 1, wherein the rod-shaped element comprises at least two bodies arranged at a relative distance (dss) from one another.

8. The method according to claim 7, wherein the at least two bodies are spheres.

9. The method according to claim 7, wherein the at least two bodies are cubes.

10. The method according to claim 1, wherein the hidden channel is a bullet channel, and an assumed position of a gunman within the area of space is determined as a function of the orientation.

11. The method according to claim [1] *2*, wherein the rod-shaped element comprises a marking in the distal [area] *portion*, which marking has more reflective and less reflective sections.

12. The method according to claim 1, wherein the rod-shaped element further comprises a rod-shaped distal [area and a proximal area] *portion*, the rod-shaped distal [area] *portion* being configured for insertion into the hidden channel and the proximal [area] *portion* comprising at least one enlarged body providing at least two measuring points which are different from one another.

13. An apparatus structured to capture three-dimensional data of an area of space, comprising:

a laser scanner having a transmitter and a receiver, the transmitter being configured for sending out a plurality of measuring beams (Ls) to a plurality of measuring points in the area of space, and the receiver being configured to receive a plurality of reflected beams (Lr) which are reflected by the measuring points [and], to determine a plurality of distances to the plurality of measuring points as a function of the reflected beams (Lr), *to determine for each measuring point of the plurality of measuring points a gray scale value that depends on an intensity of respective ones of the plurality of reflected beams (Lr), and to record a cloud of points, representative of the plurality of measuring points in the area of space, determined as a function of the plurality of distances and respective gray scale values, and*

*a rod-shaped element comprising a defined geometric shape,* wherein the receiver is [also arranged] *configured* for determining an orientation of a hidden channel at an object in the area of space, wherein [a] *the* rod-shaped element has a [free end] *proximal portion* which protrudes from an entry opening of the hidden channel,

*wherein* the receiver *is configured for: matching an ideal image of the geometric shape to the cloud of points that represent measuring points of the geometric shape, the geometric shape having a first three-dimensional coordinate and at least one second three-dimensional coordinate in the area of space;* determining [a first distance] *the first three-dimensional coordinate* to a first measuring point at the [free end] *proximal portion* and [at least one second distance] *the at least one second three-dimensional coordinate* to a second measuring point at the [free end] *proximal portion using the ideal image that is matched to the cloud of points that represent measuring points of the geometric shape; and, determining the orientation of the hidden channel as a function of a vector between the first and second three-dimensional coordinates*.

14. The apparatus according to claim 13, wherein the rod-shaped element further comprises a rod-shaped distal [area and a proximal area] *portion*, the rod-shaped distal [area] *portion* being configured for insertion into the hidden channel and the proximal [area] *portion* comprising at least one enlarged body providing at least two measuring points which are different from one another.

* * * * *